Dec. 23, 1969  H. ZIRNGIBL ET AL  3,485,584
VAPOUR PHASE OXIDATION PROCESS
Filed April 6, 1966
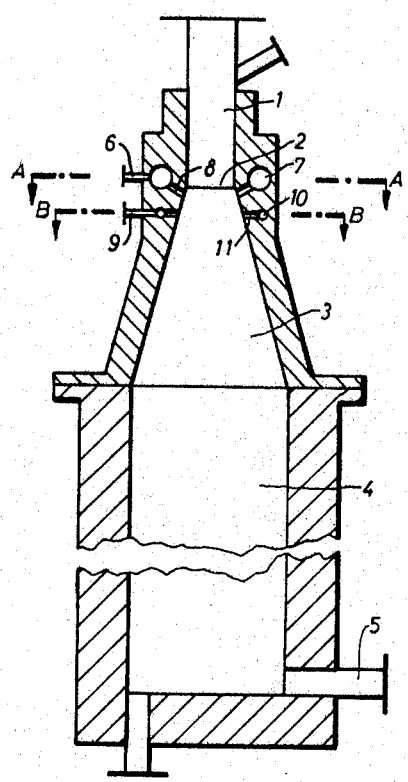
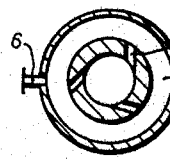
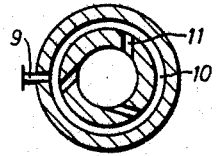
INVENTORS:
HANS ZIRNGIBL, KARL BRÄNDLE, PETER BEUMER, WALTER WEIDMANN.
BY Burgess, Dinklage & Sprung
ATTORNEYS

United States Patent Office 3,485,584
Patented Dec. 23, 1969

3,485,584
VAPOUR PHASE OXIDATION PROCESS
Hans Zirngibl, Duisburg, Karl Brandle and Peter Beumer, Krefeld and Walter Weidmann, Duisburg-Mundelheim, Germany, assignors to Farbenfabriken Bayer Aktiengesellschaft, Leverkusen, Germany, a corporation of Germany
Filed Apr. 6, 1966, Ser. No. 540,633
Claims priority, application Germany, Apr. 15, 1965,
F 45,833
Int. Cl. C01g 23/08
U.S. Cl. 23—202                                        19 Claims

ABSTRACT OF THE DISCLOSURE

Exothermic or weakly endothermic reaction at high temperature with preheated gaseous reactants, e.g. combustion of vaporizable metal halide such as $TiCl_4$ with oxygen-containing gas at 800–2000° C. to form the corresponding oxide such as solid $TiO_2$, in which one reactant is heated to the ignition temperature to initiate reaction upon contact with the other reactant, in which one of such reactants is introduced at a velocity up to about 20 m./sec. centrally and axially into a conically diverging combustion zone maintained in contiguous transitional flow relation with a reaction zone downstream therefrom while the other such reactant is introduced at a velocity of about 30–120 m./sec. in the form of a plurality of spaced apart peripheral jets transversely into the combustion zone at an angle of about 0.90° to the tangent and 0–25° to the cone axis, the product of the specific gravity and velocity of the transversely introduced reactant being 1–2 orders of magnitude greater than the product of the corresponding values for the centrally introduced reactant and the jet diameters being about $\frac{1}{5}$–$\frac{1}{20}$ of the path traversed by such jets in the combustion zone, and in which the reaction product as a result of such introduction, inherent mixing, and combustion is passed to the downstream reaction zone for completion of the reaction, e.g. growth of the $TiO_2$ particles.

---

This invention relates to a process for carrying out gas phase reactions and is concerned with a continuous process for carrying out exothermic or weakly endothermic reactions between gaseous and/or vaporous reaction components and/or solid bodies for the production of finely divided inorganic solid substances.

It is, for example, possible to obtain oxides or nitrides by the reaction of metal or semi-metal halides which are advantageously vaporizable with, for example, air, oxygen, water or ammonia at a high temperature. The process is particularly suitable for the production of oxides in pigment-fine division. It is of cardinal importance in the production of oxides which are suitable as pigments that the pigment particles should be of a uniform and accurately defined size. When carrying out the reaction, therefore, it is extremely important that the mixing of the reactants should be effected under accurately controlled conditions and as quickly as possible, because it is only then that uniform reaction conditions can be guaranteed. In contrast, if the mixing is protracted, the reaction zone is extended over a wide range and the temperatures in the reaction zone and also the residence time of the particles already formed are very different in the high temperatures region.

With many known processes of this nature, burners are proposed which consist of coaxial tubes or of numerous juxtaposed nozzles which can also be disposed at a slight inclination to one another; the separate reactants are in this case blown through different tubes into the reaction zone. In the case of these parallel streams, the mixing is not effected instantaneously, but only gradually in proportion as the parallel streams are whirled and absorbed in their boundary areas. In addition, for the purpose of avoiding settlement in the nozzles and even clogging thereof, it has been variously suggested that an inert gas stream should be provided between the outlet openings of the different reactants. In this case, the danger of settlement is certainly reduced, but, as a result, the mixing of the reaction components is still further retarded, and the grain size distribution of the pigment particles becomes less satisfactory.

We have now found a process for carrying out exothermic and/or weakly endothermic reactions at high temperatures between at least partially gaseous or vaporous reaction components, and with preheating of the latter, in which process one or more reaction components are heated to such high temperatures that the igniting temperature of the reaction mixture is at least reached and thereafter at least one of the reaction components is centrally introduced, at a velocity of up to 20 m./sec., into a combustion chamber opening conically upwards, or advantageously downwards, which chamber is mounted on a vertical reactor, whilst the other reaction component, or components, optionally mixed with an inert gas, is, or are, blown into the combustion chamber which widens out in a funnel-shaped manner transversely of that part of the reaction components which is flowing axially upwards, and at a velocity between 30 m./sec. and 120 m./sec. through inlet openings whose inclination relatively to the tangent is fixed at between 0° and 90° and whose inclination upwardly or downwardly relatively to the horizontal is between 0° and 25°, the product of the specific gravity and the velocity of the reaction component or components which enter the combustion chamber in a transverse stream being larger by approximately 1 to 2 orders of magnitude than the product of the corresponding values for the axially introduced gas stream, and the diameter of the inlet nozzles being between a 5th and a 20th part of the flow path to be traversed.

In the present process, the disadvantages described above are prevented since a rapid and intimate mixing of the reaction components is obtained. The process is especially suitable for carrying out gas phase reactions for the production of finely divided solids, for example, finely divided metal oxides. It is especially suitable for the production of excellent $TiO_2$ pigments by the oxidation of titanium tetrahalides, especially $TiCl_4$.

According to this process, the mixing is effected by a part of the reaction components being injected centrally and axially from above into the reaction chamber; the other reaction component or components is, or are, introduced at the start of the reaction path and laterally in a transverse stream relatively thereto. The position of the inlet openings for the transverse stream can be radial; the inlet openings may, however, also be set at a certain angle relatively to the radius. They form an angle of 10° to 45° in the direction of the gas stream relatively to the horizontal.

Following this mixing zone is a combustion chamber which is constructed as an upwardly, or advantageously downwardly, opening cone, which is then followed by a lined cylindrical chamber. The construction of the mixing zone as a cone is essential for carrying out the process in the best possible manner. The mixing is effected in the narrow portion of the cone, so that the mixing paths remain short, that is to say, so that the gas jets can penetrate quickly and completely. With the inlet openings in a non-radial position, i.e., when blowing in the gases with a tangential component, an eddy is set up and this results in a return suction in the cone which contributes to a better mixing, provided it does not exceed a certain value. Finally, the cone makes possible a step-less transition from the narrow mixing portion of the combustion chamber to the reactor, so that eddies on the edges, which would have an adverse effect on the mixing, cannot occur.

The instantaneous and complete mixing of the reactants entering the mixing chamber is very important for the quality of the pigment. The jets from the narrow inlet openings must be able to penetrate the gas jets entering centrally from above. The depth of penetration of the gas jets depends not only on their velocity, the pressure at the nozzles and, at a given pressure, on the nozzle diameter, but also on the specific gravity of the injected gas, in the sense that, with comparable conditions, the velocity of the heavier gas can be lower than that of a gas of lower specific gravity in order to achieve the same penetration effect.

It is not possible to give a detailed theoretical discussion and to reproduce by formulae the relationships between the penetration of the transversely flowing gas stream into the axial stream and the mixing. Experiments produced a relationship dependent on the order of magnitude of the difference between the products, and such that the product of the specific gravity and the velocity of the material issuing from the inlet openings in the transverse stream is greater by approximately 1 to 2 orders of magnitude than the product of the specific gravity and the velocity of the axial gas stream. In addition, with given nozzle pressures, the ratio between the nozzle diameter and the length of penetration should be between 1:5 and 1:20. Special values and the pre-heating temperatures for special reactions are indicated in the examples.

In carrying a continuous process into effect, it is very important, especially in the production of oxidic pigments, that depositions and accumulations on the wall of the reactor should be avoided or kept very small. The danger of such accumulations is very great because nucleus formation on the wall can, in certain circumstances, be very much assisted by comparison with nucleus formation in the vapour phase. The reaction on the wall can now be inhibited through a change in the conditions on the wall, for example, through a lowering of the wall temperature by cooling. At the same time, a curtain of inert gas can be applied to the wall. This arrangement will be described below with reference to the accompanying drawing.

The reactor for carrying out the process of the invention has inlet openings for the reactant and, situated beneath these inlet openings, another set of openings (section plane B—B in FIG. 3 of the drawing), which are set at an angle to the radius and, advantageously, are substantially tangential. The colder inert gas injected here is applied as a rotating gas curtain to the wall and holds the reaction mixture away from the wall. Simultaneously, cold inert friction bodies can be introduced, which are held on the wall by the rotating gas curtain or screen with a circulating motion and which prevent depositions on the wall.

A second method of avoiding settlement on the wall is provided by the use of a porous reactor wall. Gases, for example, chlorine or nitrogen, which are inert with respect to the reaction, are forced in the dry state through the porous wall into the reactor, whereby the wall temperature is likewise lowered to about 500° C. to 800° C.

Especially when halides are being reacted, the inert gas which is introduced must be absolutely dry, in order reliably to avoid preferential oxide formation by the substantially faster hydrolysis reaction. In addition to the walls of the reactor being cooled, a reaction with the reaction products deposited on the wall can also be caused by the gases which are introduced. Deposited $TiO_2$ can be reconverted into $TiCl_4$. Carbon or carbon-containing compounds are used as reducing agents. Thus, carbon monoxide or carbon tetrachloride can, for example, be added to the chlorine introduced through the nozzles or through the porous wall. It is also possible to use a carbonaceous material, such as graphite, as the reactor wall. In this case, the carbonaceous compounds (CO, $CCl_4$) which are supplied are able to reduce the wear on the reactor wall which is caused by the reaction.

Another way of preventing settlement on the wall is to prevent as far as possible any oversaturation of the gas phase and the preference for nucleus formation on the wall which is caused thereby. This is done by adding to one part of the reaction components a nucleus which is already complete, so that the latter is already present at the moment of reaction. This is advantageously effected by a corresponding proportion of the $TiCl_4$ being added to the oxygen or oxygen-containing gas mixture and being already converted into $TiO_2$ on reaching the reaction zone, possibly in the presence of water.

The invention is now described in detail with reference to the accompanying diagrammatic drawing, in which:

FIGURE 1 is an axial section of a reactor for carrying out the purpose of the invention, and FIGURES 2 and 3 are plan sections along the lines A—A and B—B respectively in FIGURE 1.

The operation of the reactor is explained by using as an example the oxidation of $TiCl_4$ with air or oxygen to form pigment-fine $TiO_2$. One of the reactants is introduced centrally from above, for example, the oxidizing gas, such as air, oxygen-enriched air or pure oxygen. The oxidizing gas enters the conical portion of the reactor 3 at 2. The second reactant in this case is $TiCl_4$, which enters the annular chamber 7 through the supply pipe 6 and passes from there through a number of openings 8 into the inlet end of the reaction chamber, in order to be mixed at this point with the oxidizing gas. The arrangement of the inlet openings is shown in FIG. 2. (Only 3 openings are shown here, but there may be 2 openings or far more than 3 openings.) They can be arranged radially or so that their axes form an angle with the radius of about 10° to 40°. In addition, as shown in the diagram, the inlet openings can also slope down in relation to the horizontal. The mixing of the pre-heated components is effected by penetration of the gas jets into the axially entering gas stream. If the gas inlet openings are set at an angle relatively to the radius, in other words, if the gas entering through the openings has a tangential component, a whirling or eddying of the gas which further improves the mixing action is also produced. Alternatively, the oxidizing gas may be introduced laterally through the openings and the $TiCl_4$ may be introduced axially.

One or more nozzles 11, through which a cold and dry inert gas can be injected into the conical portion of the reactor, is or are situated beneath the openings for one of the reaction components. If there are several nozzles, these are connected by means of an annular pipe 10 to the inert gas supply pipe 9 (section B—B). The angle at which the nozzles are set relatively to the radius is large and advantageously tangential. The inert, colder gas which is introduced here and which is, for example, chlorine or nitrogen forms a rotating curtain or screen of inert gas, which is applied to the reactor wall, and thus prevents the reaction gas mixture from reaching the wall and from reacting thereon with the formation of incrustations.

It is the conical burner head 3 which is most subjected to danger due to incrustation. This incrustation always appears up to a certain distance from the mixing point, a distance which is obviously shorter than the complete reaction zone.

The opening angle of the cone must be chosen in such a way that a certain return suction contributes to the better mixing. Nevertheless too strong a return suction must be avoided, because it has a disadvantageous effect.

The reaction chamber 4, in which the growth of the oxide particles which are formed also takes place, and in which the reaction is completed, is no longer affected by depositions.

The suspension of $TiO_2$ in the waste gas is discharged at 5. Here, it is quenched with inert gases or returned reaction gas and further cooled in a following cooling system down to $<100°$ C. The finely divided $TiO_2$ is separated from the reaction gas by using conventional methods such as, for example, cyclones, or tubular filters.

The process may also be carried out, for example, by using a modified arrangement into which the reaction components are introduced at the bottom, the solid reaction components being then removed with the reaction gases at the upper end of the reaction chamber. The process can also be carried out in horizontally arranged apparatus.

The process is conducted in such a way that residence times shorter than 5 seconds and advantageously from 0.001 second to 1 second can be maintained.

The gases introduced for the reaction can have admixed therewith a returned reaction waste gas or an inert gas.

It is possible continuously or intermittently to add solid inert material to the inert gas rotating in the combustion chamber on the wall thereof. The inert bodies thereby circulate around the wall and keep this free from depositions of product. The inert friction bodies have a specific gravity between 2 and 5, a grain diameter of from 0.1 mm. to about 4 mm., and advantageously a spherical form. They consist of compact substances having a high resistance to abrasion which are sintered or obtained from melts; for example, they may consist of oxides, such as $Al_2O_3$, $SiO_2$, $TiO_2$, $ZrO_2$, of the corresponding mixed oxides, or of $ZrSiO_4$.

The introduction of the inert friction bodies takes place at the same height, but separately from the inert gas nozzles (not shown in the diagram). The inert bodies are taken up by the gas stream and travel downwardly with a circulatory motion along the conical surface. The friction bodies may also be introduced into the gas supply pipe before the entry of the inert gas into the reaction chamber, so that both the inert gas and sand, for example, are discharged from the nozzles. In another constructional form, a fluid bed of inert friction bodies can be kept in motion by means of chlorine above the inert gas nozzles, and these bodies can drop over an overflow weir into the reactor until they are again taken up by the inert gas.

With the oxidation of $TiCl_4$ to $TiO_2$ pigment, it is advantageous to work with an excess of oxygen; the ratio between $O_2$ and $TiCl_4$ is preferably set between 1.0 and 1.3.

The reaction of the $TiCl_4$ with oxygen, air or oxygen-enriched air occurs at temperatures between 800° C. and 2000° C.

At least one of the components used for the reaction, or an inert gas, may be heated either with heat exchangers or by electrical means to approximately the reaction temperature or above, possibly after having been pre-heated by conventional means. Electrical heating methods include, for example, electric resistance heating, plasma burners, blown arcs, high-frequency heating or induction heating.

The heating of the oxygen component up to the reaction temperature can be effected by heating this component by combustion with a carbonaceous compound, e.g. CO, in an antechamber. In one preferred form of the invention, the oxygen component is introduced axially into the reactor, and the supply of CO to the oxygen-containing gas which has already been pre-heated by conventional means occurs just before the position at which the halide flows into the mixing zone.

Finally, the oxygen component can also be heated by indirect heat exchange with inert and advantageously ceramic materials.

Modifying agents, such as $Al_2O_3$, $ZrO_2$, $SiO_2$, alkali metal ions, alkaline earth metal ions or steam are expediently supplied for the reaction. They can be added as such, in the form of solid bodies or in aerosol form, to one reaction component or to an inert gas. However, it is also possible for the compounds in the halide form to be introduced or admixed in the solid or in the vaporized state.

In one form of the invention, modifying agents in the halide form, for example, $AlCl_3$ or $SiCl_4$, are mixed with the axially entering, oxygen-containing gas, the preheating temperature of the oxygen component being chosen in such a way that the halides react to the corresponding oxides and are present in aerosol form in the gas stream. If a halide, such as aluminum chloride, is introduced in solid form into the oxygen stream, alkali metal and alkaline earth metal compounds can be admixed with the aluminum chloride.

However, it is also possible to admix the vaporized $AlCl_3$ with the hot $TiCl_4$ stream and introduce it in this form into the reaction.

Nuclei or seeds are added to the oxidation reaction, and in fact these nuclei or seeds should be present already in a developed form when they reach the mixing zone. In this way, there is firstly avoided an over-saturation of the gas phase as a possible starting point of depositions on the wall, and secondly there is achieved a more uniform growth and a closer particle size distribution of the product.

The production of the nuclei can be affected by branching off a partial stream of the $TiCl_4$ and converting this partial stream into $TiO_2$ before it reaches the mixing zone. The following procedure is adopted for the production of $TiO_2$ nuclei: a partial stream of the $TiCl_4$ is admixed with the preheated oxygen or the oxygen-containing gas and is converted here into the oxide. The reaction must be completed before the inlet into the mixing zone. With the mixing of the reaction components, the reaction product can immediately grow onto the fresh nuclei, which are as it were in status nascendi. Water or oxides of nitrogen may be added to the stream of oxygen since these compounds react more quickly with the $TiCl_4$ than the oxygen itself and thus facilitate the nucleus or seed formation.

Another possibility consists in the use of foreign seeds. Thus, instead of a partial stream of $TiCl_4$, it is also possible for suitable proportions of, for example, $SiCl_4$ or $AlCl_3$ to be supplied in vapour form to the oxygen stream and to be converted therein, optionally also in the presence of water or of nitric oxides, to oxide particles in an extremely finely divided form and having seeding properties.

A combination of a $TiCl_4$ partial stream with $SiCl_4$ and/or alkali metal and/or alaline earth metal ions for the production of the nuclei or seeds may also be used.

Finally, a lower valency titanium chloride can also be used as seeds. For this purpose, a certain quantity of the reducing agent, e.g. hydrogen, is added to the $TiCl_4$ and the resulting sub-chloride is carried with the stream of $TiCl_4$ into the mixing zone. The compounds used for the seed formation are in such proportions that the oxide serving as seeds or nuclei amounts to 0.5% to 5%, calculated on the $TiO_2$ which is produced. In the case in which $TiCl_3$ is used as seeds or nuclei, 0.5% to 5% of the $TiCl_4$ introduced into the reactor is reduced to the sub-chloride.

The invention is further illustrated by the following examples.

Example 1

5.28 cubic meters per hour of $TiCl_4$ were introduced through a central inlet pipe 1 of a reactor 3, 4, as shown in the drawing, and entered a conical portion of the reactor at 2. In addition, 26 liters of liquid $TiCl_4$ per hour were vaporized with steam at 15 atm. gauge, and thereafter heated in an electric resistance furnace at 980° C.; the tetrachloride entered the reactor at this temperature. The diameter of the pipe 1 was 90 mm. and the corresponding gas velocity at 2 was 1.06 m./sec.

A mixture of 6.87 cubic meters of $O_2$ and 8.95 cubic metres of $N_2$ (at NTP) per hour was blown in through the annular pipe 7 and the inlet opening for the transverse stream 8, there being six openings with a diameter of 5 mm. the $Ti:O_2$ ratio was accordingly 1:1.3 and the proportion by volume of the titanium tetrachloride in the reaction mixture was 25%. The $O_2/N_2$ mixture was preheated to 600° C. The velocity of entry into the mixing zone was 91.5 m./sec. The setting of the openings was such that their axes formed an angle of 25° relatively to the radius; the openings sloped downwardly at 10° relatively to the horizontal. The opening angle of the cone was 20°.

Underneath the inlet for the oxidizing gas, 4 cubic metres per hour (at NTP) of nitrogen at a temperature of 500° C. were injected tangentially through two nozzles 11, the nitrogen having bicorite sand (melted aluminum oxide) added thereto.

In the reaction zone, the temperature at the hottest point was above 1100° C. A sufficient quantity of vaporized aluminum chloride was added to the hot $TiCl_4$ for the titanium dioxide formed to contain 1% of $Al_2O_3$. Steam in a quantity of 2 moles percent calculated on the titanium, was added to the oxygen-containing gases. The reaction product was discharged from the reactor at 5 as a suspension in the waste gas, and was very rapidly cooled with cold inert gas or returned waste gas to a temperature below 600° C. Before the rapid cooling, the waste gas had the following composition: $Cl_2=42.1\%$; $O_2=6.3\%$, $N_2=51.6\%$.

The further operations, such as cooling and dust separation were effected by conventional methods, such as water condensers, cyclones and dust filters.

The titanium dioxide which was obtained had a maximum brightening power of 760 according to DIN 53 192 and of 1750 according to Reynolds.

Example 2

The apparatus used in this example corresponded generally to the arrangement shown in the drawing except that in this case the wall of the cone was made of porous material. A mixture of 12.2 cubic meters of $O_2$ and 8.43 cubic meters of $N_2$ per hour (at NTP) was heated to 960° C. and introduced at 2 with a velocity of 11.5 m./sec. into the reactor 3, 4.

50 liters per hour of titanium tetrachloride were vaporised with steam at a pressure of 15 atm. gauge, heated to 890° C. by means of a resistance furnace having a graphite bed supplied at 6 to an annular pipe 7, and injected from this pipe through six openings 8 with a diameter of 5 mm. transversely of the flow of the oxygen-containing gas into the reactor. The injection velocity was 109.5 m./sec. The inlet openings were set radially and sloped downwardly by 20° relatively to the horizontal.

Aluminum chloride and steam were added in the same proportions as those indicated in Example 1, except that here these additions were made to the gas stream containing oxygen. The cone commencing immediately below the inlet for the $TiCl_4$ was made double-walled; the inner wall consisted of porous graphite. 6 cubic meters (at NTP) of chlorine were introduced into an annular chamber and forced through the porous graphite wall, the area of which was 1925 cm.$^2$, into the conical portion of the reactor.

The reaction mixture, without the chlorine forced in through the porous wall, had the composition: 33.0% by volume of $TiCl_4$, 39.6% by volume of $O_2$ and 27.4% by volume of $N_2$; the $TiCl_4:O_2$ ratio was 1:1.2. The percentages by volume of $Cl_2$, $O_2$ and $N_2$ were 71.6%, 5.5% and 22.9% respectively.

The suspension of $TiO_2$ in waste gas, quenched immediately after the reaction was completed, was worked up as described in Example 1. The titanium dioxide which was obtained had good pigment properties; the brightening power according to DIN 53192 was 785 and according to Reynolds, was 1825.

Example 3

The reaction, as described in Example 2, was repeated, except that here a partial stream of $TiCl_4$, namely 2%, was also mixed before the mixing zone with the oxidizing gas, which contained steam, so that, immediately before the mixing zone, this partial stream of $TiCl_4$ reacted with water and very finely divided $TiO_2$ was carried by the gas stream into the reaction zone and was able to act in the latter as nuclei or seeds.

The product had excellent pigment qualities.

What we claim is:

1. Process for carrying out the vapor phase oxidation of titanium tetrachloride to titanium dioxide of pigment quality, which comprises heating at least one of oxygen-containing gas as first reactant and vapor phase titanium tetrachloride as second reactant to a sufficiently high temperature to initiate reaction upon contact with the other of said oxygen-containing gas and vapor phase titanium tetrachloride, introducing one of said first and second reactants at a velocity up to 20 m./sec. substantially centrally and axially into a substantially conically diverging combustion zone which is in contiguous transitional flow relation with a reaction zone downstream therefrom, introducing the other of said first and second reactants at a velocity between about 30–120 m./sec. in the form of a plurality of spaced apart peripheral jets transversely into said combustion zone in a direction at an angle of between about 0–90° with respect to the tangent at the corresponding peripheral point of introduction and at an angle of between about 0–25° with respect to a plane normal to the axial direction of flow of such centrally introduced reactant, the product of the specific gravity and the velocity of the transversely introduced reactant being greater by about 1–2 orders of magnitude than the corresponding product of the specific gravity and the velocity of the centrally introduced reactant and the diameters of said jets being between about one-fifth to one-twentieth of the linear flow path traversed by such jets in said combustion zone, whereby the so-introduced reactants are immediately intensively intermixed such that the sufficiently high temperature heated at least one reactant initiates reaction with the other reactant in said combustion zone, and passing the resulting reaction mixture to said reaction zone for completion of the reaction.

2. Process according to claim 1 wherein a comparatively cold inert gas is introduced into said combustion zone and conducted in a circular path along the corresponding confining surface of said combustion zone to form a cooling curtain preventing deposition of solidifiable reaction products on such surface.

3. Process according to claim 2 wherein an inert particle material is maintained in said inert gas and conducted in said circular path to assist in preventing such product deposition.

4. Process according to claim 3 wherein said inert particle material has a grain size between about 0.5–4 mm.

5. Process according to claim 1 wherein said combustion zone conically diverges at an angle between about 10–20° which respect to the corresponding cone axis.

6. Process according to claim 1 wherein the corresponding confining surface of said combustion zone is a gas-permeable material selected from the group consisting of graphite and ceramic material and a comparatively cold inert gas selected from the group consisting of nitrogen and chlorine is forced through such gas-permeable confining surface to cool such surface and prevent deposition of solidifiable reaction products on such surface.

7. Process according to claim 6 wherein said inert gas contains admixed therewith a member selected from the group consisting of carbon monoxide and carbon tetrachloride.

8. Process according to claim 1 wherein at least one modifying agent selected from the group consisting of aluminum oxide, zirconium oxide, silicon dioxide, steam, alkali metal ions, and alkaline earth metal ions is admixed with the centrally introduced reactant.

9. Process according to claim 8 wherein said titanium tetrachloride is combusted in said combustion zone with said oxygen-containing gas at a temperature between about 800–2000° C. to form titanium dioxide.

10. Process according to claim 9 wherein sufficiently high temperature heated at least one reactant is said oxygen-containing gas which is heated by combustion with carbon monoxide admixed therewith prior to introduction into said combustion zone.

11. Process according to claim 10 wherein said titanium tetrachloride is the transversely introduced reactant while said oxygen-containing gas is the centrally introduced reactant, and such carbon monoxide is admixed with and combusted with said oxygen-containing gas just before the intensive intermixing thereof with the tangentially introduced titanium tetrachloride reactant.

12. Process according to claim 9 wherein the residence time of the reaction mixture in said combustion zone is below about 5 seconds for the combustion of said titanium tetrachloride.

13. Process according to claim 12 wherein said residence time is between about 0.001–1 second.

14. Process according to claim 12 wherein the combustion is carried out in the presence of between about 0.5–5% $TiO_2$ nuclei based on the titanium dioxide being produced, said nuclei being formed in status nascendi by the reaction of a partial stream of titanium tetrachloride with steam.

15. Process according to claim 12 wherein the combustion is carried out in the presence of between about 0.5–5% $TiO_2$ nuclei based on the titanium dioxide being produced, said nuclei being formed in status nascendi by the reaction of a partial stream of titanium tetrachloride with a nitrogen oxide.

16. Process according to claim 12 wherein the combustion is carried out in the presence of between about 0.5–5% $TiO_2$ nuclei based on the titanium dioxide being produced, said nuclei being formed in status nascendi by the reaction of a partial stream of titanium tetrachloride with oxygen.

17. Process according to claim 12 wherein the combustion is carried out in the presence of between about 0.5–5% $TiO_2$ nuclei based on the titanium dioxide being produced, said nuclei being formed in status nascendi by the reaction of a partial stream of titanium tetrachloride with a member selected from the group consisting of silicon tetrachloride, alkali metal ions, alkaline earth metal ions, and mixtures thereof.

18. Process according to claim 12 wherein the combustion is carried out in the presence of between about 0.5–5% $TiO_2$ nuclei based on the titanium dioxide being produced, said nuclei being formed in status nascendi by the reaction of a partial stream of titanium tetrachloride with hydrogen.

19. Process according to claim 12 wherein the combustion is carried out in the presence of between about 0.5–5% nuclei based on the titanium dioxide being produced, said nuclei being formed in status nascendi by the reaction of a partial stream of silicon tetrachloride with a member selected from the group consisting of steam, oxygen, and a nitrogen oxide.

References Cited

UNITED STATES PATENTS

| | | | |
|---|---|---|---|
| 2,670,275 | 2/1954 | Olson et al. | 23—202 |
| 3,147,077 | 9/1964 | Callow et al. | 23—202 |
| 3,105,742 | 10/1963 | Allen et al. | 23—202 |
| 3,203,763 | 8/1965 | Kruse | 23—202 |
| 3,284,159 | 11/1966 | Kruse | 23—202 |
| 3,306,760 | 2/1967 | Zirngibl et al. | 106—300 XR |

EDWARD STERN, Primary Examiner

U.S. Cl. X.R.

23—1, 142, 182; 106—300

UNITED STATES PATENT OFFICE
CERTIFICATE OF CORRECTION

Patent No. 3,485,584                       December 23, 1969

Hans Zirngibl et al.

It is certified that error appears in the above identified patent and that said Letters Patent are hereby corrected as shown below:

Column 2, line 29, after "wards" insert -- or downwards --. Column 6, line 49, "alaline" should read -- alkaline --. Column 7, line 49, "890" should read -- 980 --. Column 8, line 63, "which" should read -- with --.

Signed and sealed this 5th day of May 1970.

(SEAL)
Attest:

Edward M. Fletcher, Jr.
Attesting Officer

WILLIAM E. SCHUYLER, JR.
Commissioner of Patents